United States Patent
Wada et al.

(10) Patent No.: US 11,334,842 B2
(45) Date of Patent: May 17, 2022

(54) AUTOMATIC ESTIMATION METHOD, SERVER, AND AUTOMATIC ESTIMATION SYSTEM

(71) Applicant: MISUMI CORPORATION, Tokyo (JP)

(72) Inventors: Takaaki Wada, Tokyo (JP); Mitsunobu Yoshida, Tokyo (JP); Kenji Nakagawa, Tokyo (JP); Atsushi Shibata, Tokyo (JP)

(73) Assignee: Misumi Corporation, Tokyo (JP)

(*) Notice: Subject to any disclaimer, the term of this patent is extended or adjusted under 35 U.S.C. 154(b) by 775 days.

(21) Appl. No.: 15/074,479

(22) Filed: Mar. 18, 2016

(65) Prior Publication Data
US 2017/0270479 A1    Sep. 21, 2017

(51) Int. Cl.
*G06Q 10/08* (2012.01)
*G06Q 10/06* (2012.01)

(52) U.S. Cl.
CPC ..... *G06Q 10/08345* (2013.01); *G06Q 10/067* (2013.01)

(58) Field of Classification Search
CPC .............. G06Q 30/0611; G06Q 30/0283
USPC .............. 705/7.11, 7.12, 7.22, 7.23, 7.25
See application file for complete search history.

(56) References Cited

U.S. PATENT DOCUMENTS

| | | | |
|---|---|---|---|
| 2005/0129304 A1* | 6/2005 | Sasazawa | G01B 11/0608 382/150 |
| 2014/0146040 A1* | 5/2014 | Moon | G06T 19/20 345/419 |
| 2015/0308813 A1* | 10/2015 | Morrissey | G01B 11/005 356/612 |
| 2019/0213653 A1* | 7/2019 | Herrman | G06Q 30/0283 |

FOREIGN PATENT DOCUMENTS

| | | | |
|---|---|---|---|
| JP | 2002-351929 A | 12/2002 | |
| JP | 2003-181842 A | 7/2003 | |

OTHER PUBLICATIONS

Mickaël, Caux, and Anselmetti Bernard. "3D ISO Manufacturing Specifications with Vectorial Representation of Tolerance Zones." International journal of advanced manufacturing technology 60.5-8 (2011): 577-588. Web. (Year: 2011).*
Kamali Nejad, M et al. "3D Simulation of Manufacturing Defects for Tolerance Analysis." Journal of computing and information science in engineering 10.2 (2010): n. pag. Web. (Year: 2010).*
Chikara Nakayama, "Extremely Automated Trial Service which realizes immediate estimation and quick delivery", News Flash, Production Innovation, Nikkei Monozukuri (Nikkei Craftsmanship), No. 658, pp. 22-23, published in Jul. 2009 by Nikkei Business Publications, Inc.

* cited by examiner

*Primary Examiner* — Akiba K Robinson
(74) *Attorney, Agent, or Firm* — Carrier Blackman & Associates, P.C.; Joseph P. Carrier; Jeffrey T. Gedeon (57) ABSTRACT

An automatic estimation method comprises a first step (STEP 01) of introducing a shape data on an item, a second (Continued)

step (STEP 02) of recognizing a shape of the item on the basis of the shape data, a third step (STEP 06) of acquiring a manufacturing condition which can be selected on the basis of the recognized shape, a fourth step (STEP 08) of displaying the manufacturing condition and corresponding price and delivery time, and a fifth step (STEP 09, STEP 10) of updating the displayed price and delivery time depending on change of the manufacturing condition.

7 Claims, 10 Drawing Sheets

FIG.3

UPLOAD CAD DATA

● SPECIFY FILE —10a
OR

→ DRAG AND DROP FILE    10b

● ADD NEW FILE

LIST OF ESTIMATES

| No | | NAME | UPDATED DATE | PRICE | DELIVERY TIME | | |
|---|---|---|---|---|---|---|---|
| | | TF13ZZ0369.STEP 1 Solids | Last Update 2014/07/14 | ¥8,888 | SHIP ON 6TH DAY AFTER | ▤ | ✥ |
| | | TF13ZZ0349.STEP 1 Solids | Last Update 2014/07/14 | ¥222,222 | SHIP ON 99TH DAY AFTER | ▤ | ✥ |
| | | TF13ZZ0339.STEP 1 Solids | Last Update 2014/07/14 | ¥11,111 | SHIP ON 6TH DAY AFTER | ▤ | ✥ |

AUTOMATIC ESTIMATION METHOD, SERVER, AND AUTOMATIC ESTIMATION SYSTEM

BACKGROUND OF THE INVENTION

Field of the Invention

The present invention relates to an automatic estimation method, a server and an automatic estimation system for automatically estimating a manufacturing cost and delivery time of an item from a manufacturing condition of the item.

Description of the Related Art

In the past, in manufacturing a mechanical device or the like, it is required to estimate a manufacturing cost and a delivery time regarding objects, at a stage of designing the objects, such as sheet-metal parts, machining parts, stamping parts, and injection-molded parts (hereinafter, collectively referred to as "item") which are used to configure the mechanical device or the like.

As a system supporting the design of such an item, a design support system has been known in which a user transmits design data via the Internet or the like to a server, and a parts manufacturer presents an estimate regarding a manufacturing cost and a delivery time on the basis of the design data (e.g., see Japanese Patent Laid-Open No. 2003-181842).

On the other hand, generally, the item has different manufacturing conditions such as tolerance, material, hardness, surface treatment or the like depending on the mechanical device or the like to be used. The manufacturing cost and delivery time for the item change depending on the manufacturing condition.

However, in the conventional design support system, the manufacturing condition can be arbitrarily changed at a stage of creating the design data, but data only with the fixed manufacturing condition has been used for processing at a stage of estimating the manufacturing cost and delivery time of the item.

Therefore, in the conventional system, it has been concerned to be difficult to comprehensively make a decision about determination on a specification of the item while considering the manufacturing cost and the delivery time, unless a user has technical knowledge of its processing and the manufacturing cost.

The present invention has been made in consideration of the above, and has an object to provide an automatic estimation method, a server, and an automatic estimation system capable of easily determining a specification of an item by a user with a price and a delivery time being taken into consideration.

SUMMARY OF THE INVENTION

An automatic estimation method according to the present invention comprises a first step of introducing shape data on an item via an input terminal, a second step of recognizing a shape and a size of the item input to the input terminal based on the shape data, a third step of acquiring a manufacturing condition including a tolerance which can be selected in manufacturing the item, based on the recognized shape and size of the item, a fourth step of selectably displaying the manufacturing condition on a display terminal, and acquiring and displaying on the display terminal a price or a delivery time corresponding to the displayed manufacturing condition and a 3D model of the item to which the size and the tolerance corresponding to the manufacturing condition are added, and a fifth step of updating, depending on the manufacturing condition selected via the input terminal, the price or the delivery time, and the size and the tolerance added to the 3D model which are displayed on the display terminal.

A server according to the present invention comprises a feature recognition processing unit configured to recognize a shape and a size of an item based on a shape data on the item input via an input terminal, a first information storage unit configured to store a manufacturing condition including a tolerance which can be selected in manufacturing the item based on the shape and size of the item recognized by the feature recognition processing unit, a second information storage unit configured to store a price or a delivery time corresponding to the manufacturing condition, a displayed information processing unit configured to acquire the manufacturing condition corresponding to the item from the first information storage unit, and acquire the price or the delivery time corresponding to the selected manufacturing condition from the second information storage unit, and a display processing unit configured to selectably display the manufacturing condition acquired by the displayed information processing unit on a display terminal, and display the price or the delivery time corresponding to the selected manufacturing condition, and a 3D model of the item to which the size and the tolerance corresponding to the manufacturing condition are added on the display terminal.

An automatic estimation system according to the present invention comprises a server, an input terminal, and a display terminal, wherein the server includes a feature recognition processing unit configured to recognize a shape and a size of an item based on a shape data on the item input via the input terminal, a first information storage unit configured to store a manufacturing condition including a tolerance which can be selected in manufacturing the item, based on the shape and size of the item recognized by the feature recognition processing unit, a second information storage unit configured to store a price or delivery time corresponding to the manufacturing condition, a displayed information processing unit configured to acquire the manufacturing condition corresponding to the item from the first information storage unit, and acquire the price or the delivery time corresponding to the selected manufacturing condition from the second information storage unit, and a display processing unit configured to selectably display the manufacturing condition acquired by the displayed information processing unit on the display terminal, and display the price or the delivery time corresponding to the selected manufacturing condition, and a 3D model of the item to which the size and the tolerance corresponding to the manufacturing condition are added on the display terminal.

In this way, in the automatic estimation method, the server and the automatic estimation system according to the invention, the shape of the item from the input shape data is automatically recognized, and thereafter, the manufacturing condition which can be selected for the item are presented. Then, when the manufacturing condition is changed, the price or delivery time corresponding to that change is presented. In other words, the configuration is such that the price or delivery time to be presented is changed in conjunction with the manufacturing condition change by the user.

Therefore, according to the automatic estimation method, the server, and the automatic estimation system of the invention, even if the user does not have any technical knowledge of processing, he/she can easily determine the specification of the item with the price and the delivery time being taken into consideration.

In the automatic estimation method according to the invention, it is preferable to acquire, in the third step, based on the recognized shape of the item, all of the manufacturing conditions which can be selected in manufacturing the item and the prices or the delivery times corresponding to the manufacturing conditions.

In this way, all of the patterns are calculated in advance before presenting the price or delivery time corresponding to the manufacturing condition on the display terminal, which improves a response until the price or delivery time is displayed on the occasion when the user changes the manufacturing condition.

In the automatic estimation method according to the invention, it is preferable that, in a case where the first to fifth steps are repeatedly performed in this order, the manufacturing condition selected in the fifth step is stored, and the manufacturing condition stored in the fifth step last time is used as the manufacturing condition to be selectably displayed on the display terminal in the fourth step next time.

In a case where a system to which the invention is applied is used plural times by the user, by storing the manufacturing condition which was selected by the user last time of usage and using that manufacturing condition as the manufacturing condition to be initially displayed next time of usage as described above, it is possible to save the trouble for the user to select again.

In the automatic estimation method according to the invention, it is preferable that, in the third step, based on the recognized shape of the item, a variation item is acquired which satisfies only a part of the manufacturing condition or has a shape similar to the shape of the item, and a manufacturing condition is acquired which can be selected in manufacturing the item or the variation item.

The server according to the invention is preferable to further comprise a variation information storage unit configured to store therein, based on the shape of the item recognized by the feature recognition processing unit, information on a variation item which satisfies only a part of the manufacturing condition or has a shape similar to the shape of the item, wherein the displayed information processing unit acquires the manufacturing condition corresponding to the item and the variation item from the first information storage unit, and acquires the price or the delivery time corresponding to the selected manufacturing condition from the second information storage unit, and the display processing unit selectably displays the manufacturing condition, or the item or the variation item acquired by the displayed information processing unit on the display terminal, and displays the price or the delivery time corresponding to the selected manufacturing condition and the item or the variation item on the display terminal.

In this way, presentation of the manufacturing condition concerning not only the item satisfying the manufacturing condition but also the variation item satisfying only a part of the manufacturing condition or having a shape similar to the shape of the item (e.g., an item having a similar shape or a so-called semi-processed article) allows to widen the range of user choice.

DETAILED DESCRIPTION OF THE PREFERRED EMBODIMENTS

Hereinafter, a description is given of an embodiment of the present invention with reference to the drawings.

Figure 1:
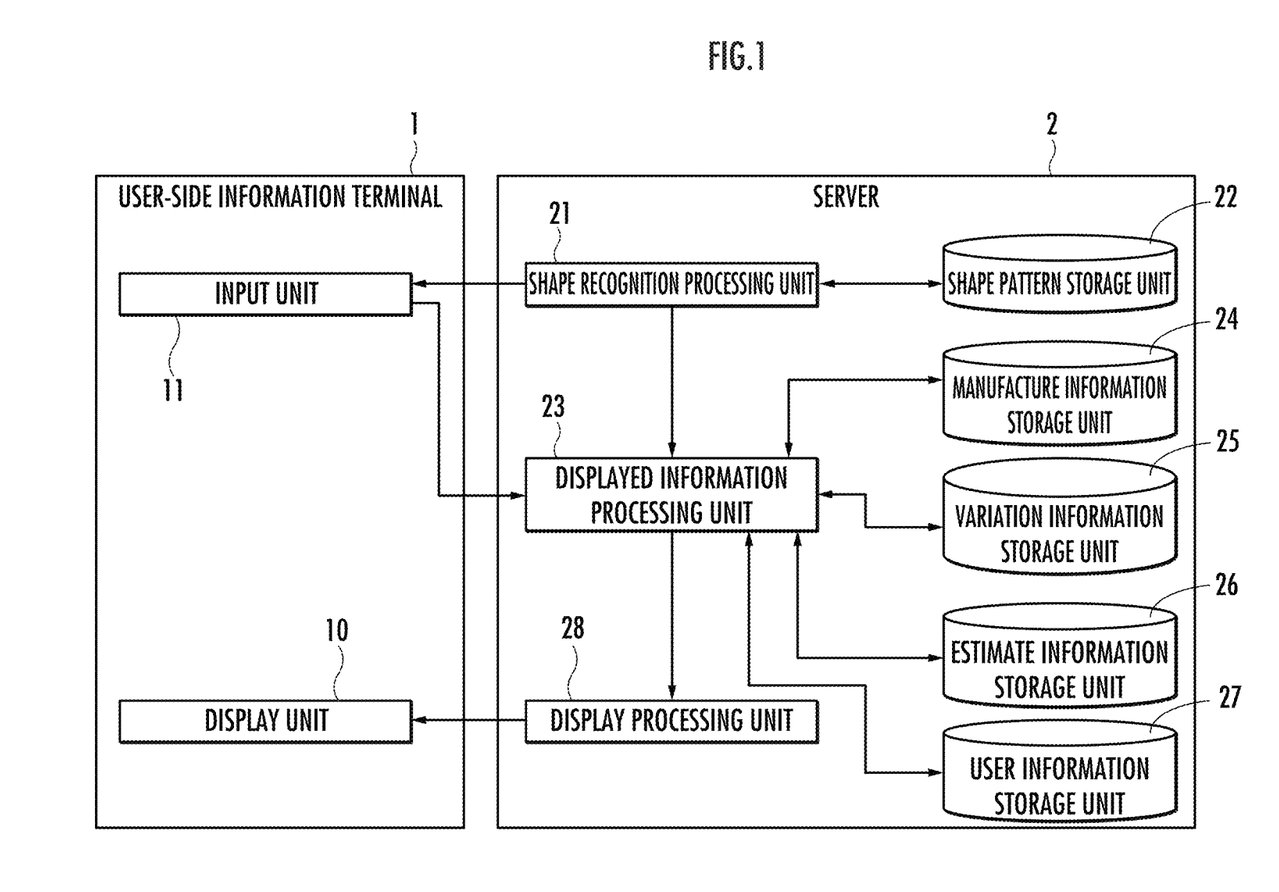
FIG. 1 is a block diagram showing a configuration of an automatic estimation system according to an embodiment of the invention.

First, referring to FIG. 1, a description is given of a configuration of an automatic estimation system according to the embodiment.

The automatic estimation system according to the embodiment includes a user-side information terminal 1 and a server 2 connected with the user-side information terminal 1 via a line such as the Internet.

The user-side information terminal 1 has a display unit 10 (display terminal) configured by various displays such as a liquid crystal display or the like, and an input unit 11 (input terminal) configured by a keyboard and a mouse or the like. The server 2 receives information input via the input unit 11 to perform an automatic estimation process on the basis of the information, and then, transmits a result of the process to the user-side information terminal 1.

The server 2, which is an electronic unit including a CPU, a memory, and various interface circuits or the like, is connected with the display unit 10 and input unit 11 of the user-side information terminal 1 via a network. The server 2 includes a feature recognition processing unit 21, a shape pattern storage unit 22, a displayed information processing unit 23, a manufacture information storage unit 24 (first information storage unit), a variation information storage unit 25, an estimate information storage unit 26 (second information storage unit), a user information storage unit 27, and a display processing unit 28.

The feature recognition processing unit 21 performs a process for recognizing a shape of an item, based on a manufacturing condition of sheet-metal parts, machining parts, stamping parts, injection-molded parts and the like (hereinafter collectively referred to as "item") used to configure a mechanical device or the like, which is input via the input unit 11 of the user-side information terminal 1.

The shape pattern storage unit 22 stores therein a schematic pattern of an item corresponding to shape data input by a user.

The displayed information processing unit 23 acquires information from the manufacture information storage unit 24, the variation information storage unit 25, the estimate information storage unit 26 and the user information storage unit 27. The displayed information processing unit 23 performs a process for determining information to be displayed on the basis of the acquired information, the information input via the input unit 11 by the user, and the shape of the item recognized by the feature recognition processing unit 21.

The manufacture information storage unit 24 stores therein the manufacturing conditions which can be selected in manufacturing a predetermined item.

The variation information storage unit 25 stores therein information on an item having a shape similar to a predetermined item and a semi-processed article of a predetermined item.

The estimate information storage unit 26 stores therein a production technology requirement, price, and delivery time corresponding to the manufacturing condition.

The user information storage unit 27 stores therein information on the manufacturing condition or the like regarding the item selected when the user using the automatic estimation system performs an order placement process.

The display processing unit 28 displays various pieces of information on a display screen of the display unit 10 according to a signal from the displayed information processing unit 23.

Next, referring to FIG. 2 to FIG. 10, a description is given of processes performed in the automatic estimation system according to the embodiment.

Figure 2:
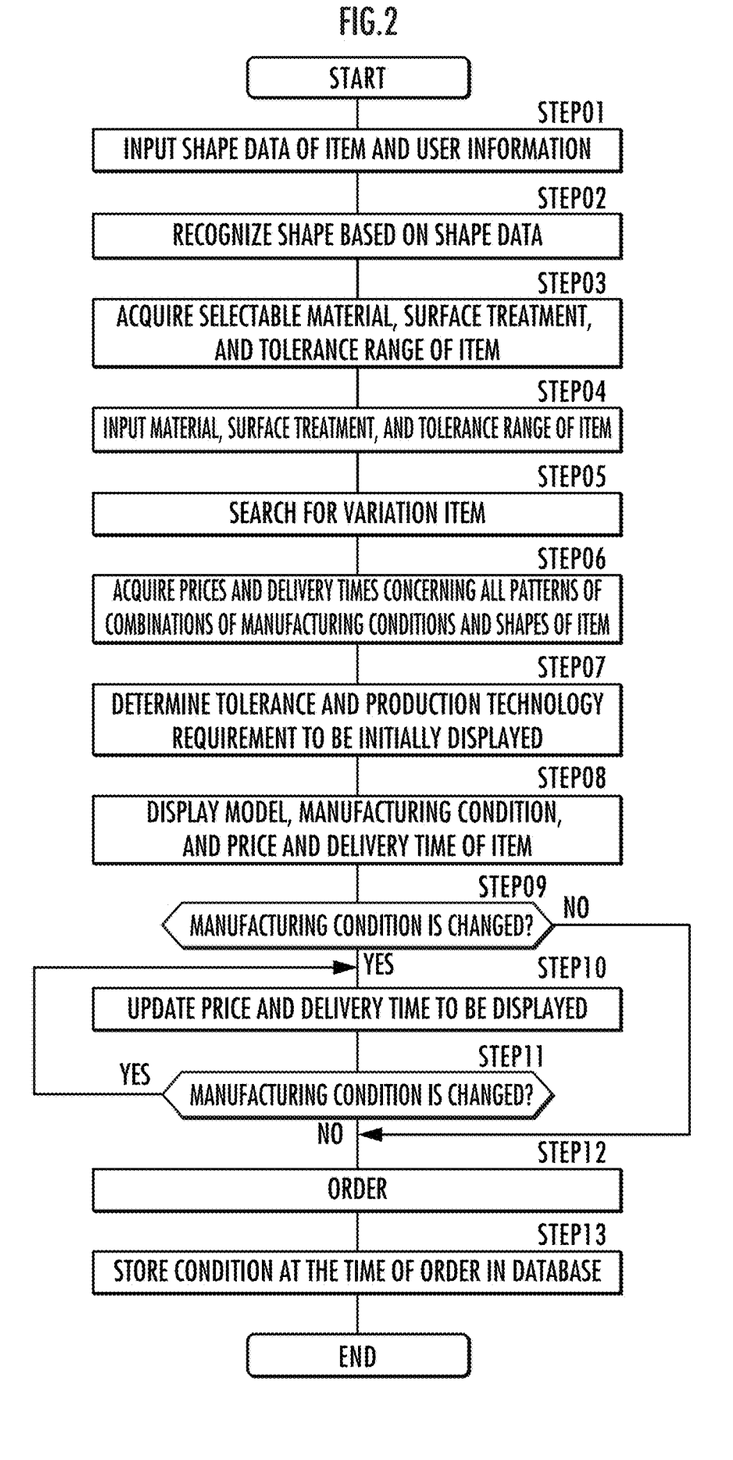
FIG. 2 is a flowchart showing a process performed by the automatic estimation system in FIG. 1.

First, the user transmits user information such as a user name or a file name and shape data on the item via the input unit 11 to the server 2(FIG. 2/STEP 01).

Figure 3:
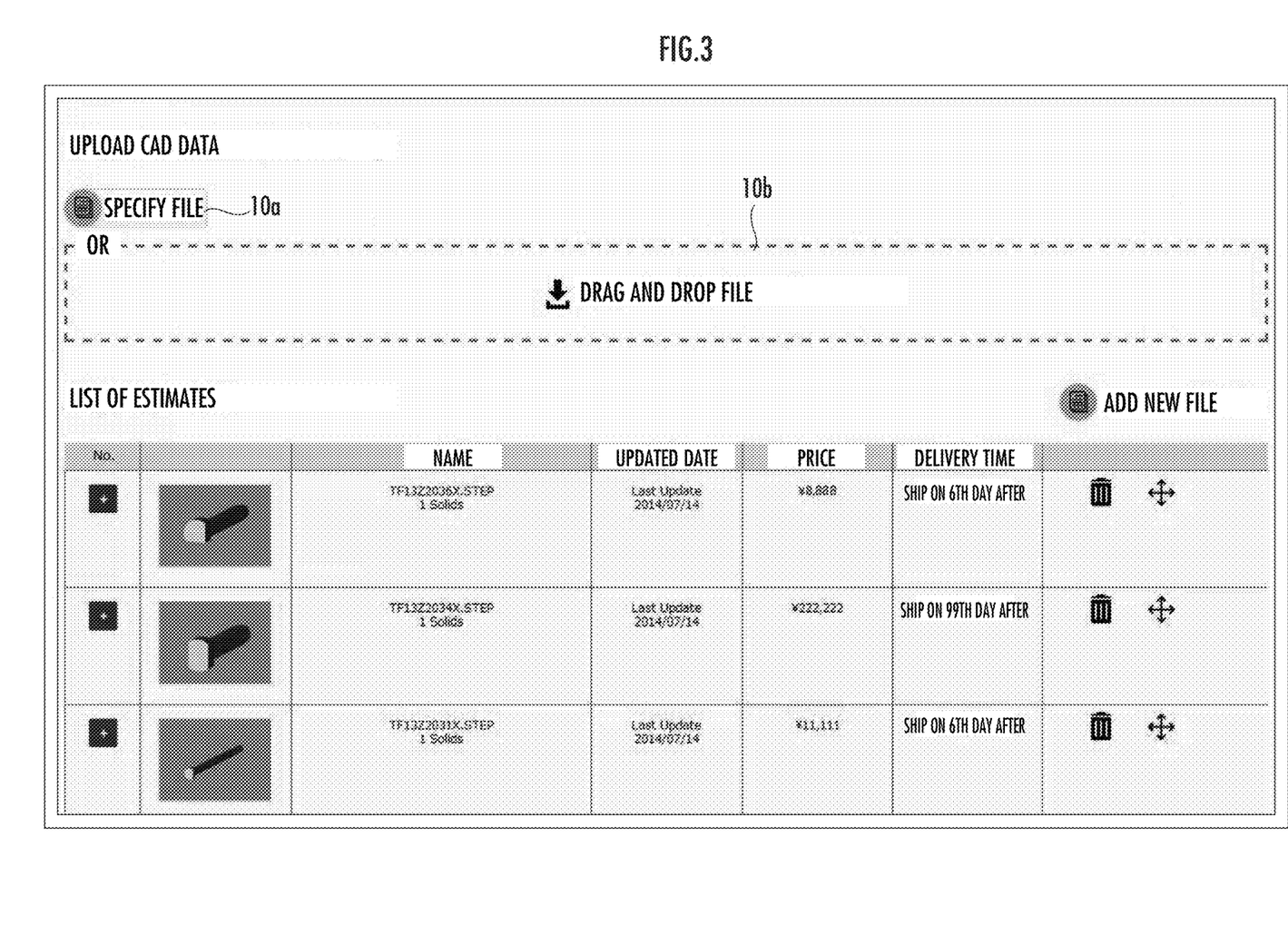
FIG. 3 is a diagram showing an exemplary image displayed on a display screen at STEP 01 in FIG. 2.

At STEP 01, an image as shown in FIG. 3 is displayed on the display screen of the display unit 10. The user chooses a shape data specifying part 10a on the display screen to specify a data file for inputting the shape data, or directly inputs the shape data in a shape data input unit 10b. The shape data input in such a way is transmitted via an Internet connection to the feature recognition processing unit 21 in the server 2.

The automatic estimation system according to the embodiment uses the design data of 3D CAD data including size data as the shape data on the item. However, the shape data is not necessarily the 3D CAD data including the size data, but may be 2D CAD data as well as data from which the shape and size of the item is recognizable.

It may be such that the user may, instead of transmitting the shape data, select one of the shapes or sizes presented by the automatic estimation system and the automatic estimation system automatically acquires the shape data corresponding to the user selection.

Next, the feature recognition processing unit 21 of the automatic estimation system performs a feature recognition process on the basis of the received shape data (FIG. 2/STEP 02).

Figure 4:
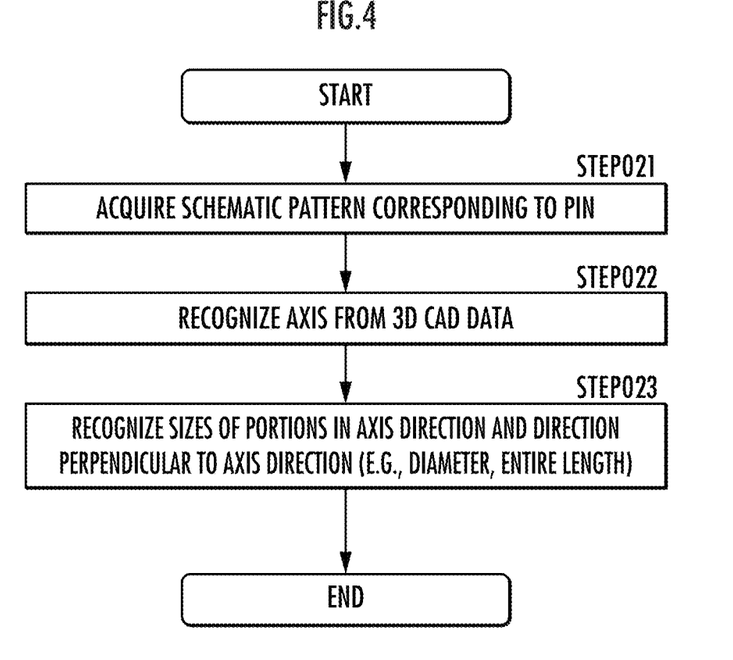
FIG. 4 is a flowchart showing a process performed by the automatic estimation system in FIG. 1 at STEP 02 in FIG. 2.

This feature recognition process is performed following a procedure described in a flowchart shown in FIG. 4 in a case where the item is a pin, for example.

Concretely, first, when receiving the shape data transmitted by the user, the feature recognition processing unit 21 acquires a schematic shape pattern corresponding to a kind of the item specified by the user (that is a pin, in this embodiment) from the shape pattern storage unit 22 (FIG. 4/STEP 021).

In the embodiment, the schematic shape pattern refers to a general shape pattern of the item. For example, if the kind of the item is a pin, the pattern may be a pattern having a shaft, and a head, a shank and a tip in this order from one side in a direction of the shaft.

Next, the feature recognition processing unit 21 searches the 3D CAD data for a cylindrical shape of the shank and recognizes a shaft of the cylinder as the shaft of the pin (FIG. 4/STEP 022).

Finally, the feature recognition processing unit 21 acquires the sizes of portions in the shaft direction and a direction perpendicular to the shaft direction (e.g., diameter, entire length) from the 3D CAD data (FIG. 4/STEP 023).

Through the above processes, the feature recognition processing unit 21 recognizes and acquires the shape of the item described in the shape data input by the user and the sizes of respective portions of the item. The feature recognition processing unit 21 also calculates a tolerance which can be selected besides this feature recognition process. Further, the feature recognition processing unit 21 also checks a production technology requirement besides this feature recognition process.

Next, the displayed information processing unit 23 of the automatic estimation system obtains the manufacturing condition which can be selected (e.g., material, surface treatment, tolerance range) from the manufacture information storage unit 24 on the basis of the kind of the item input by the user and the shape of the item recognized by the feature recognition processing unit 21 (FIG. 2/STEP 03).

Figure 5:
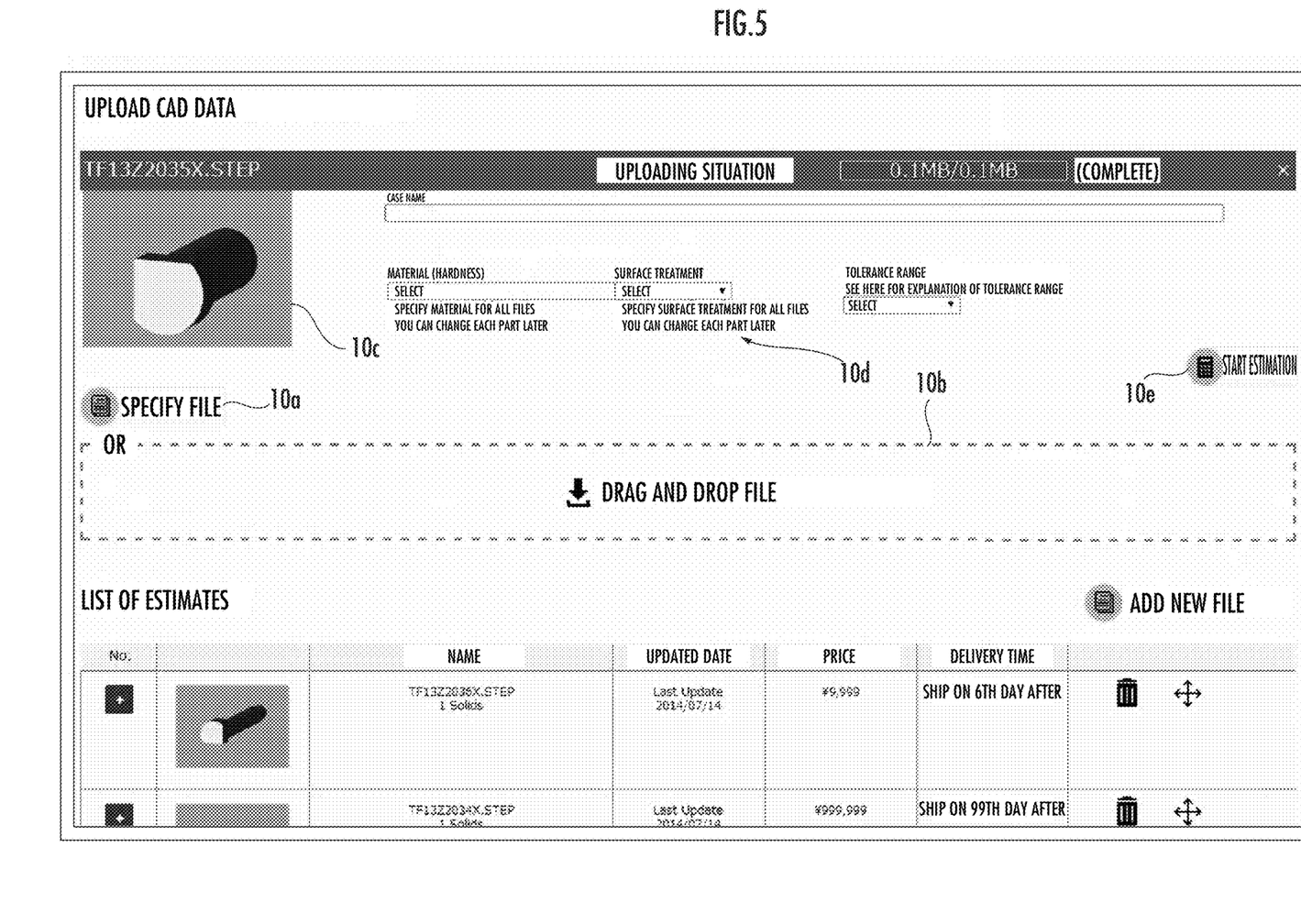
FIG. 5 is a diagram showing an exemplary image displayed on the display screen after STEP 03 in FIG. 2.

Then, after STEP 03, as shown in FIG. 5, the display processing unit 28 of the server 2 displays a schematic shape of the recognized item in an item shape displaying part 10c on the display screen of the display unit 10 and displays the material, the surface treatment, and the tolerance range in a selectable form in a manufacturing condition selecting part 10d.

Figure 6:
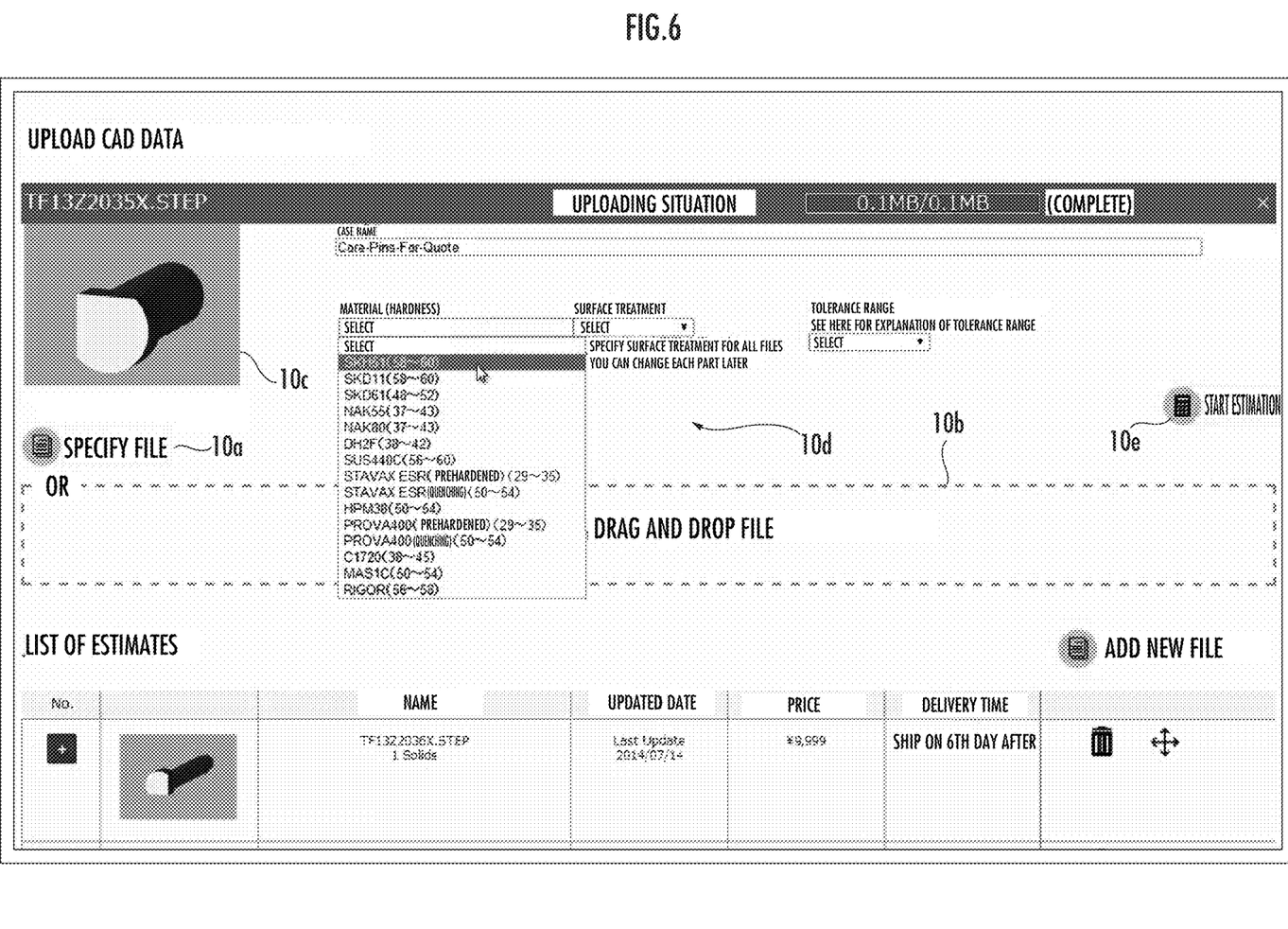
FIG. 6 is a schematic view of an image displayed on the display screen at STEP 04 in FIG. 2 when a user selects a manufacturing condition.

Next, as shown in FIG. 6, the user selects an arbitrary manufacturing condition of the material, the surface treatment and the tolerance range displayed in the manufacturing condition selecting part 10d on the display screen in the display unit 10 via the input unit 11 (FIG. 2/STEP 04).

The user may omit the selection of the manufacturing condition at this stage.

After STEP 04, the user chooses an estimation starting part 10e displayed on the display screen of the display unit 10 to transmit a signal for starting an estimation process to the server 2.

Next, on the basis of the shape of the item recognized by the feature recognition processing unit 21, the displayed information processing unit 23 of the automatic estimation system searches the variation information storage unit for information on an item having a shape similar to the recognized item and on a semi-processed article of the recognized item which may satisfy a part of the manufacturing conditions (hereinafter, collectively referred to as "variation item"), and acquires the information (FIG. 2/STEP 05).

Next, the displayed information processing unit 23 of the automatic estimation system acquires from the estimate information storage unit 26 the prices and delivery times concerning all patterns of combination of the item recognized by the feature recognition processing unit 21 and the variation items, and the manufacturing conditions which can be selected (FIG. 2/STEP 06).

Concretely, the price and delivery time is calculated by way of referring to a data table created in advance, with taking the production technology requirement in manufacturing the item into consideration, in addition to the manufacturing condition such as the tolerance which can be selected.

Next, on the basis of the user information input by the user such as the user name and the file name, the displayed information processing unit 23 of the automatic estimation system searches the information stored in the user information storage unit 27 for registration information of the relevant user, and determines the manufacturing condition to be initially displayed (FIG. 2/STEP 07).

Concretely, in a case where the registration information exists and the selection of the manufacturing condition has been omitted, the manufacturing condition for ordering used by the user last time of usage is determined as the manufacturing condition to be initially displayed. In a case where the registration information does not exist, and the selection of the manufacturing condition has been omitted, a predetermined manufacturing condition is determined as the manufacturing condition to be initially displayed. However, whether or not in the case where the registration information exists, if the selection of the manufacturing condition has been performed, the selected manufacturing condition is determined as the manufacturing condition to be initially displayed.

Next, on the basis of the information acquired and the information determined by the displayed information processing unit 23, the display processing unit 28 displays the manufacturing condition of the item in a selectable form with a 3D model of the item, and displays the price and delivery time corresponding to the condition to be initially displayed (FIG. 2/STEP 08).

Figure 7:
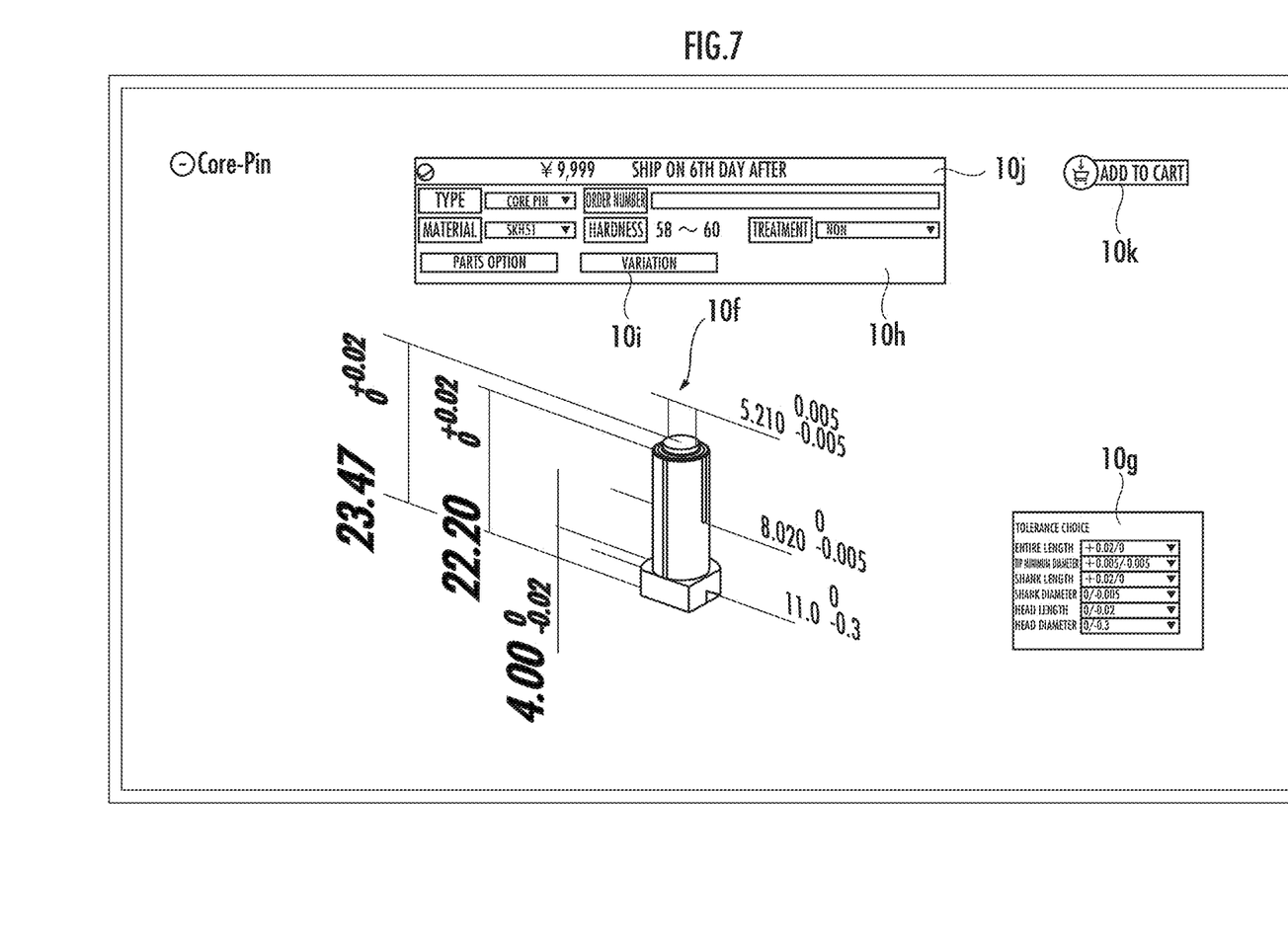
FIG. 7 is a diagram showing an exemplary image displayed on the display screen at STEP 08 in FIG. 2.

Concretely, as shown in FIG. 7, the display processing unit 28 displays a 3D model 10f substantially on the center of the display screen of the display unit 10, the model 10f displaying a model of the item recognized by the feature recognition processing unit 21 with the size data on the model to which the tolerance acquired from the manufacture information storage unit 24 is added.

The display processing unit 28 also displays a tolerance changing part 10g for changing the tolerance that is one of the manufacturing conditions at a side portion on the display screen of the display unit 10 (at a right side in the figure in FIG. 7), displays a manufacturing condition changing part 10h for changing other manufacturing conditions than the tolerance at an upper portion on the screen, displays a variation selecting button 10i in the manufacturing condition changing part 10h, displays a price and delivery time displaying part 10j for presenting the price and the delivery time at a further upper portion of the manufacturing condition changing part 10h, and displays an order instructing part 10k at a right upper portion on the screen.

Next, the displayed information processing unit 23 confirms whether or not the user has changed the manufacturing condition such as the tolerance or the kind of the item (FIG. 2/STEP 09).

Figure 8:
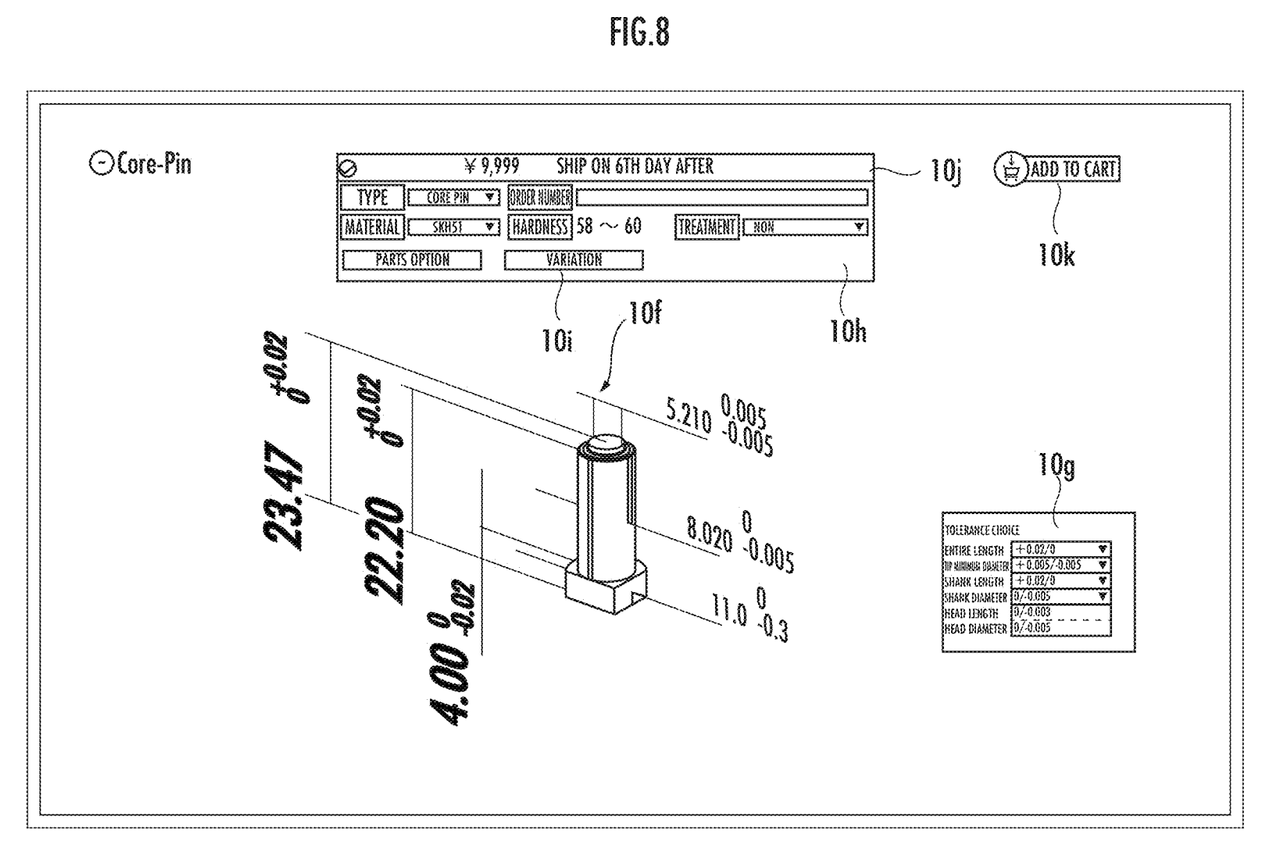
FIG. 8 is a diagram showing an exemplary image displayed on the display screen at STEP 09 in FIG. 2 when a user changes a tolerance.

At STEP 09, for example, in the case of changing the tolerance, the user selects a changed tolerance by way of the tolerance changing part 10g via the input unit 11 as shown in FIG. 8.

Figure 9:
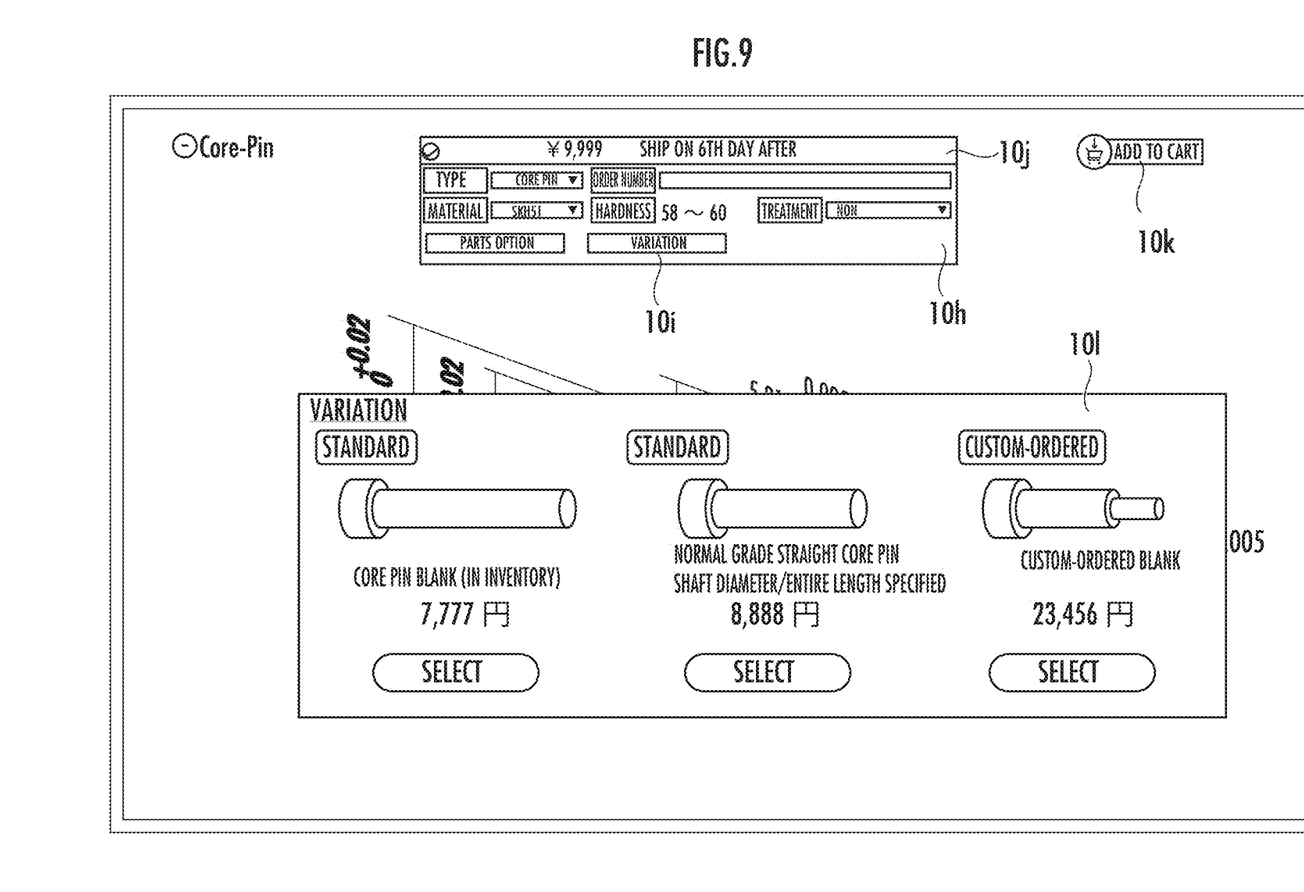
FIG. 9 is a diagram showing an exemplary image displayed on the display screen at STEP 09 in FIG. 2 when a user changes a kind of an item.

In the case of changing the kind of the item, as shown in FIG. 9, the user first chooses the variation selecting button 10i arranged in the manufacturing condition changing part 10h via the input unit 11 to transmit a signal for changing the kind of the item to the displayed information processing unit 23. The displayed information processing unit 23, when receiving that signal, transmits a signal for displaying a variation selecting part 10l to the display processing unit 28. Then, the user selects an arbitrary item from among items displayed in the variation selecting part 10l which is displayed in a way described above.

Next, if the manufacturing condition is changed (in the case of YES in FIG. 2/STEP 09), the displayed information processing unit 23 selects the price and delivery time corresponding to the change from among those already acquired, and transmits a signal for displaying that selection to the display processing unit 28. Then, the display processing unit 28 updates the price and delivery time on the display screen of the display unit 10 (FIG. 2/STEP 10).

Figure 10:
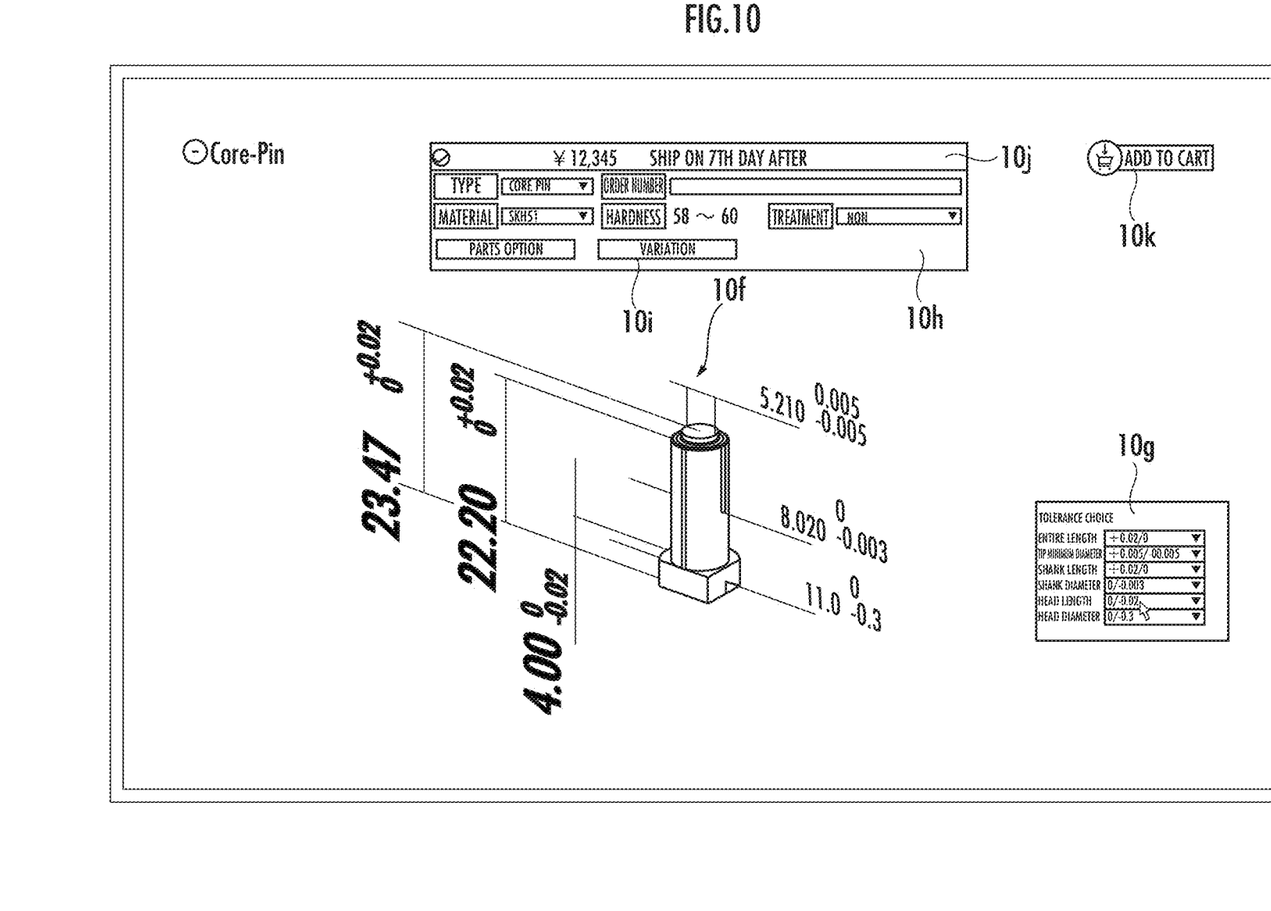
FIG. 10 is a diagram showing an exemplary image displayed on the display screen at STEP 10 in FIG. 2.

Concretely, as shown in FIG. 10, the price and delivery time displaying part 10j on the display screen is changed. If the tolerance is changed, the tolerance added to the size of 3D data is also changed at the same time.

Next, the displayed information processing unit 23 confirms again whether or not the user has changed the manufacturing condition such as the tolerance or the kind of the item (FIG. 2/STEP 11).

Then, if the manufacturing condition is changed (in the case of YES in FIG. 2/STEP 11), the displayed information processing unit 23 returns to STEP 10 (that is, following a procedure similar to STEP 10) to update the price and delivery time.

On the other hand, if the manufacturing condition is not changed (in the case of NO at STEP 09, or NO at STEP 11 in FIG. 2), the price and delivery time is not updated.

Next, when the need for changing the manufacturing condition is removed and the user chooses the order instructing part 10k on the display screen of the display unit 10, the server 2 recognizes that the order placement process is performed (STEP 12).

Finally, the displayed information processing unit 23 stores the manufacturing condition of at the time of the final order with the user information in the user information storage unit 27 (STEP 13).

As described above, the automatic estimation system according to the embodiment automatically recognizes the shape of the item from the input shape data, and thereafter, presents the manufacturing condition which can be selected for an item having that shape. Then, when the manufacturing condition is selected, the price and delivery time corresponding to that selection is presented. In other words, the system is configured such that the price and delivery time to be displayed is changed in conjunction with the manufacturing condition change by the user.

Therefore, according to the automatic estimation system in the embodiment, even if the user does not have any technical knowledge of the processing and manufacturing cost, he/she can easily determine the specification of the item with the price and the delivery time being taken into consideration.

Hereinabove, the embodiments shown in the figures are described, but the present invention is not limited to such embodiments.

For example, in the above embodiments, the display unit 10 and the input unit 11, and the server 2 are connected with each other via the Internet connection. However, the invention does not necessarily have such a configuration, and may be configured as one body terminal.

In the above embodiments, the display unit 10 and the input unit 11 are configured as separate bodies, but the invention does not necessarily have such a configuration, and the configuration may be those in which the user can select the data displayed via the display terminal by use of the input terminal. For example, a touch panel or the like may be used as the input terminal and an output terminal.

In the above embodiments, the tolerance, the material, the surface treatment, and the kind of item are selectable as the manufacturing condition. However, the invention does not necessarily have such a configuration, and only one of those conditions may be selectable, or other manufacturing conditions which have an effect on the price or the delivery time may be selectable.

Further, in the above embodiments, the price and the delivery time are variably presented. However, the invention does not necessarily have such a configuration, and only one of the price and the delivery time may be presented.

In the above embodiments, at FIG. 2/STEP 06, the prices and delivery times are acquired concerning all patterns of the combination of the manufacturing condition and the shape of the item to improve response. However, the invention does not necessarily have such a configuration, and the price and delivery time only corresponding to the manufacturing condition displayed as an initial condition may be acquired and other prices and delivery times may be acquired when the manufacturing condition is changed.

In the above embodiments, at FIG. 2/STEP 07 and STEP 13, the information used by the user last time is acquired and stored to determine the manufacturing condition to be displayed at an initial state. However, the invention may omit such a learning function.

What is claimed is:

1. An automatic estimation method executed by a CPU in a server, comprising:
    receiving shape data on an item sent from an external information terminal via a network;
    recognizing a shape and a size of the item based on the shape data;
    acquiring a first manufacturing condition relating to tolerances which can be selected in manufacturing the item, based on the recognized shape and size of the item;
    causing the external information terminal to display a first price and/or a first delivery time which is required for manufacturing the item and corresponding to the first manufacturing condition, and to display a 3D model of the item together with the size and the tolerances corresponding to the first manufacturing condition;
    receiving a second manufacturing condition sent from the external information terminal via the network;
    updating the first price and/or the first delivery time to a second price and/or a second delivery time which is required for manufacturing the item and corresponding to the second manufacturing condition;
    determining whether or not a first tolerance of the tolerances corresponding to the first manufacturing condition is changed to a second tolerance corresponding to the second manufacturing condition; and
    causing the external information terminal to display, when the first tolerance is changed to the second tolerance, the second price and/or the second delivery time, and to display the second tolerance, instead of the first tolerance, together with the 3D model while keeping the size and the tolerances other than the first tolerance displayed together with the 3D model.

2. The automatic estimation method according to claim 1, wherein
    when acquiring the first manufacturing condition, based on the recognized shape of the item, all of the manufacturing conditions which can be selected in manufacturing the item and first prices and/or first delivery times corresponding to the manufacturing conditions are acquired.

3. The automatic estimation method according to claim 1, wherein
    in the updating, the second manufacturing condition selected via the external information terminal is stored, and then the external information terminal is caused to selectably display the stored second manufacturing condition.

4. The automatic estimation method according to claim 1, wherein
    when acquiring the first manufacturing condition, based on the recognized shape of the item, a variation item which satisfies only a part of the first manufacturing condition or has a shape similar to the shape of the item is acquired, and a selectable manufacturing condition which can be selected in manufacturing the item or the variation item is acquired.

5. A server comprising:
    a CPU recognizing a shape and a size of an item based on a shape data on the item which is sent from an external information terminal via a network;
    a memory storing a first manufacturing condition relating to tolerances which can be selected in manufacturing the item, based on the recognized shape and size of the item, and storing a first price and/or a first delivery time which is required for manufacturing the item and corresponding to the first manufacturing condition;
    the CPU acquiring the first manufacturing condition corresponding to the item, and acquiring the first price and/or the first delivery time corresponding to the first manufacturing condition;
    the CPU causing the external information terminal to display the first price and/or the first delivery time corresponding to the first manufacturing condition, and to display a 3D model of the item together with the size and the tolerances corresponding to the first manufacturing condition;
    the CPU receiving a second manufacturing condition sent from the external information terminal via the network;
    the CPU updating the first price and/or the first delivery time to a second price and/or a second delivery time which is required for manufacturing the item and corresponding to the second manufacturing condition;
    the CPU determining whether or not a first tolerance of the tolerances corresponding to the first manufacturing condition is changed to a second tolerance corresponding to the second manufacturing condition; and
    the CPU causing the external information terminal to display, when the first tolerance is changed to the second tolerance, the second price and/or the second delivery time, and to display the second tolerance, instead of the first tolerance, together with the 3D model while keeping the size and the tolerances other than the first tolerance displayed together with the 3D model.

6. The server according to claim 5, wherein:
    the memory stores, based on the recognized shape of the item, information on a variation item which satisfies only a part of the first manufacturing condition or has a shape similar to the shape of the item,
    the CPU acquires a selectable manufacturing condition corresponding to the item and the variation item, and acquires the first price and/or the first delivery time corresponding to the first manufacturing condition, and
    the CPU cause the external information terminal to display the acquired selectable manufacturing condition, or the item or the variation item, and to display the first manufacturing condition and a price and/or a delivery time corresponding to the item or the variation item.

7. An automatic estimation system comprising:
a server including a CPU and a memory; and
an external information terminal,
wherein
  the CPU recognizes a shape and a size of an item based on a shape data on the item which is sent from the external information terminal via a network,
  the memory stores a first manufacturing condition relating to tolerances which can be selected in manufacturing the item, based on the recognized shape and size of the item,
  the memory stores a first price and/or a first delivery time which is required for manufacturing the item and corresponding to the first manufacturing condition,
  the CPU acquires the first manufacturing condition corresponding to the item, and acquires the first price and/or the first delivery time corresponding to the first manufacturing condition,
  the CPU causes the external information terminal to display the first price and/or the first delivery time corresponding to the first manufacturing condition, and display a 3D model of the item together with to which the size and the tolerances corresponding to the first manufacturing condition,
  the CPU receives a new second manufacturing condition sent from the external information terminal via the network,
  the CPU updates the first price and/or the first delivery time to a second price and/or a second delivery time which is required for manufacturing the time and corresponding to the second manufacturing condition,
  the CPU determines whether or not a first tolerance of the tolerances corresponding to the first manufacturing condition is changed to a second tolerance corresponding to the second manufacturing condition, and
  the CPU causes the external information terminal to display, when the first tolerance is changed to the second tolerance, the second price and/or the second delivery time, and to display the second tolerance instead of the first tolerance together with the 3D model while keeping the size and the tolerances other than the first tolerance displayed together with the 3D model.

* * * * *